United States Patent [19]
Greenberg

[11] Patent Number: 5,969,856
[45] Date of Patent: *Oct. 19, 1999

[54] CENTER MASKING ADD-ON ILLUMINATOR

[75] Inventor: Gary Greenberg, Los Angeles, Calif.

[73] Assignee: Edge Scientific Instrument Company LLC, Santa Monica, Calif.

[*] Notice: This patent is subject to a terminal disclaimer.

[21] Appl. No.: 08/818,800

[22] Filed: Mar. 14, 1997

Related U.S. Application Data

[63] Continuation-in-part of application No. 08/328,846, Oct. 25, 1994, Pat. No. 5,684,626.

[51] Int. Cl.$^6$ ................................................... G02B 21/06
[52] U.S. Cl. ......................... 359/390; 359/385; 359/388
[58] Field of Search .................................. 359/362–363, 359/368, 372, 373, 202, 385–390, 618–620, 831–837, 850–853, 866; 355/53, 67; 362/31, 298, 346, 551, 560, 297; 351/212, 221, 247

[56] References Cited

U.S. PATENT DOCUMENTS

| | | | |
|---|---|---|---|
| 4,284,327 | 8/1981 | Kraft et al. | 359/390 |
| 4,407,569 | 10/1983 | Piller et al. | 359/387 |
| 4,585,315 | 4/1986 | Sincerbox et al. | 359/387 |
| 5,046,837 | 9/1991 | Stroomer et al. | 353/53 |
| 5,078,473 | 1/1992 | McKeown et al. | 359/834 |
| 5,245,175 | 9/1993 | Inabata | 359/834 |
| 5,345,333 | 9/1994 | Greenberg | 359/389 |
| 5,684,626 | 11/1997 | Greenberg | 359/385 |

FOREIGN PATENT DOCUMENTS

| | | | |
|---|---|---|---|
| 460253 | 1/1937 | United Kingdom | 359/388 |

*Primary Examiner*—Thong Nguyen
*Attorney, Agent, or Firm*—H. Michael Brucker

[57] ABSTRACT

Apparatus for masking (center and peripheral) the microscope condenser lens to simultaneously maximize resolution, contrast and depth of field utilizing, at a conjugate plane of the aperture plane where an image of the rear aperture of the condenser lens has been created, a plurality of light sources to illuminate two or more of the faces of a multi-faced mirror in the shape of a pyramid which moves relative to the light sources to vary the amount of center masking continuously over a range including zero while directing multiple oblique beams of light onto the objective lens including such apparatus for connection to the illumination port of a light microscope in place of a standard light source.

31 Claims, 12 Drawing Sheets

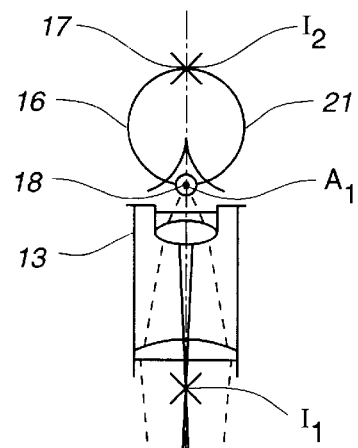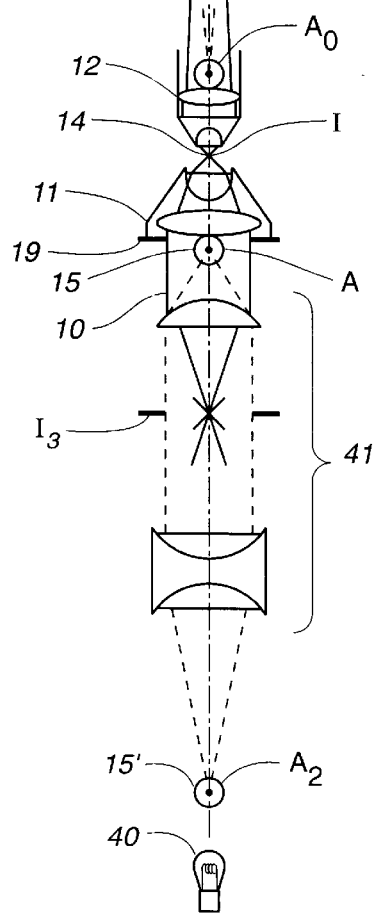
FIG._1

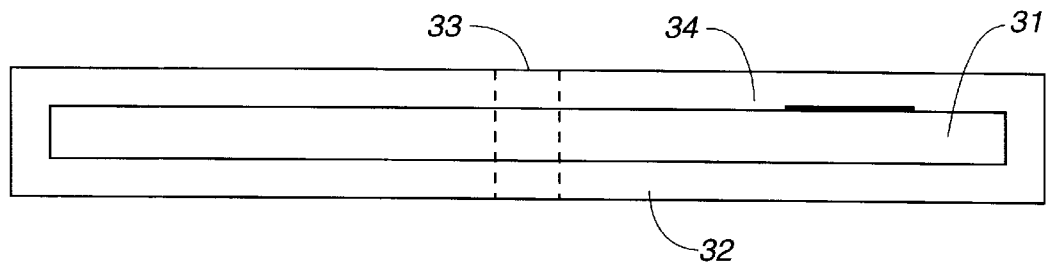
FIG._2
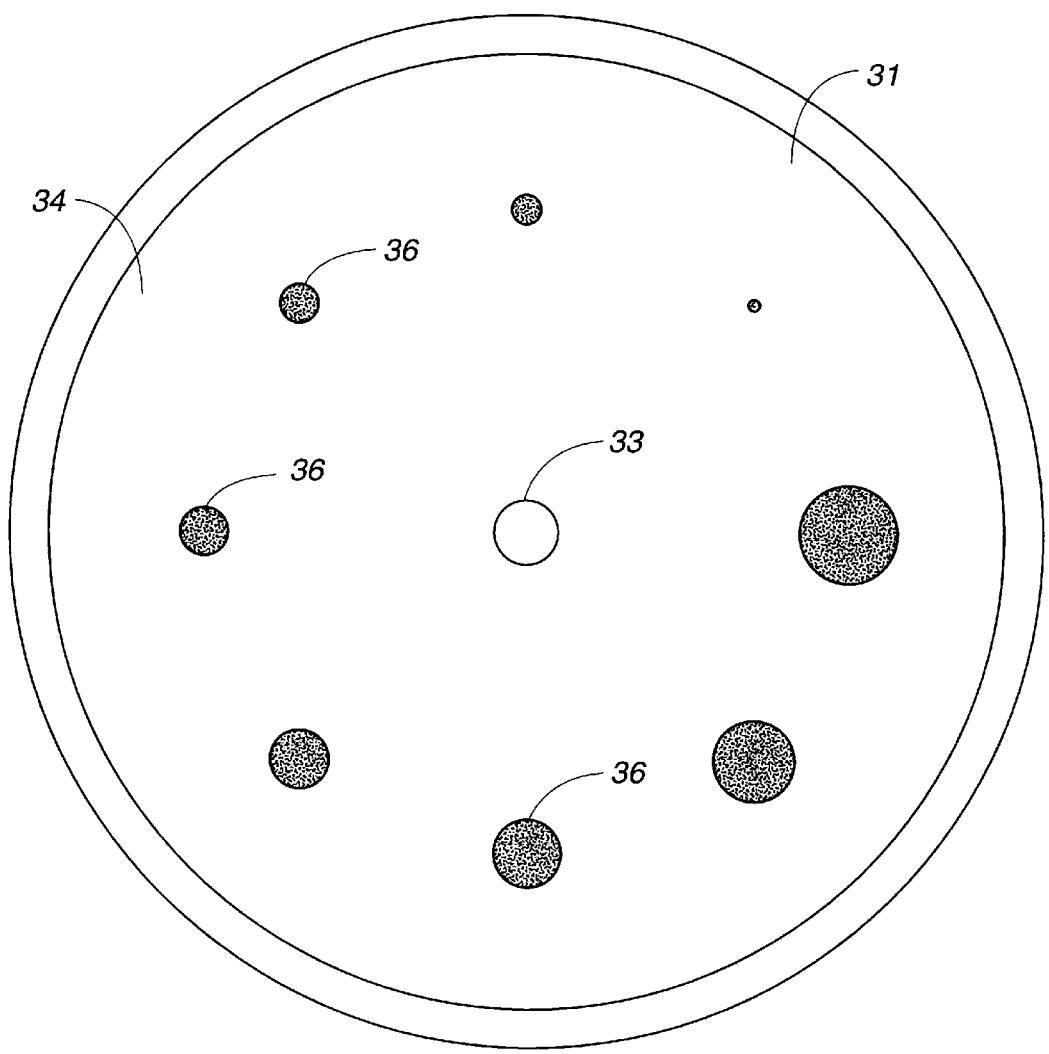
FIG._3

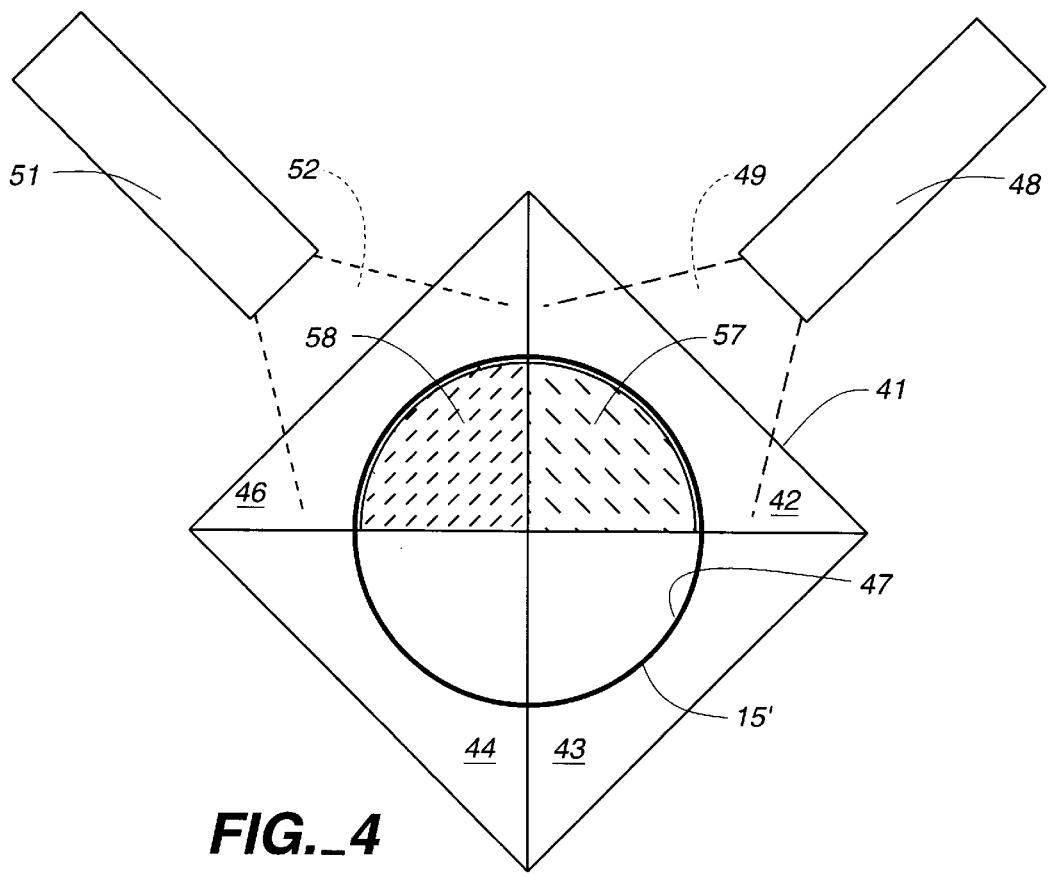
FIG._4
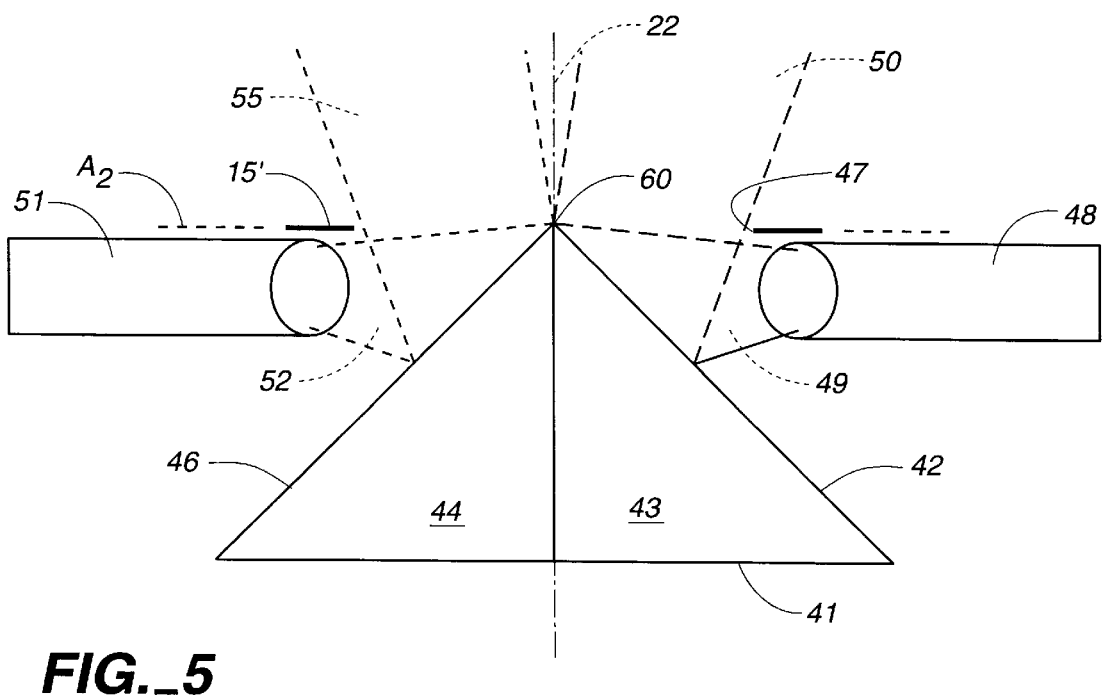
FIG._5

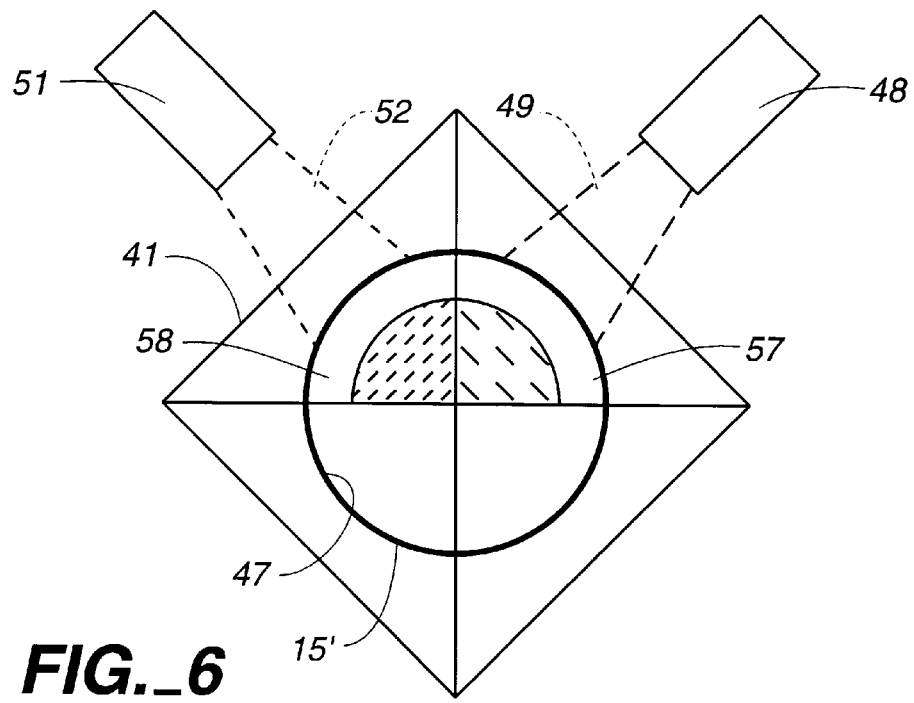
FIG._6
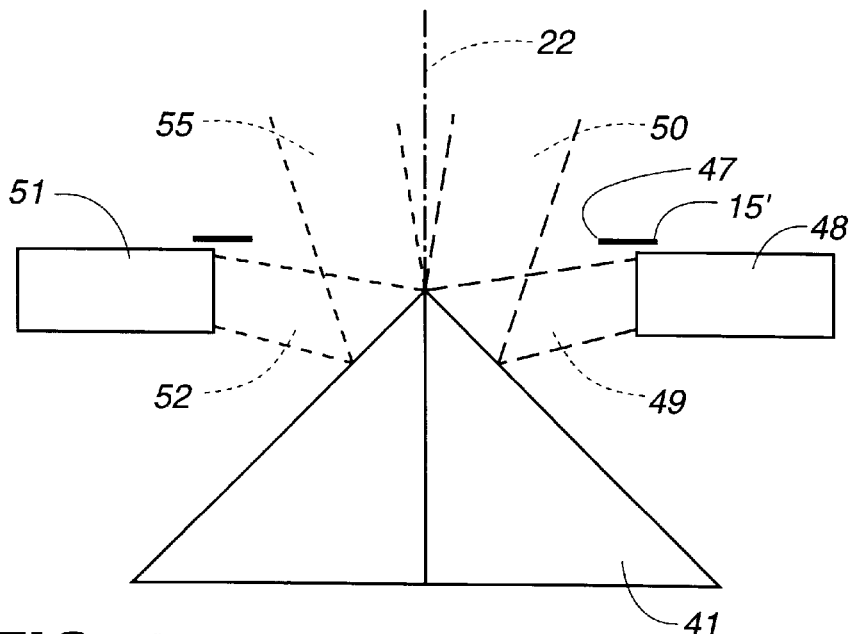
FIG._7

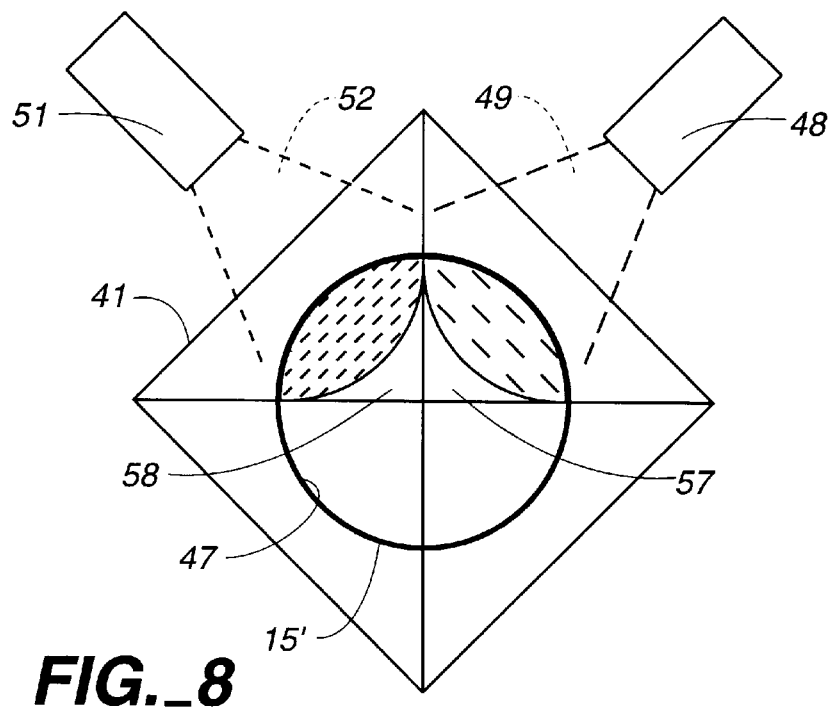
FIG._8
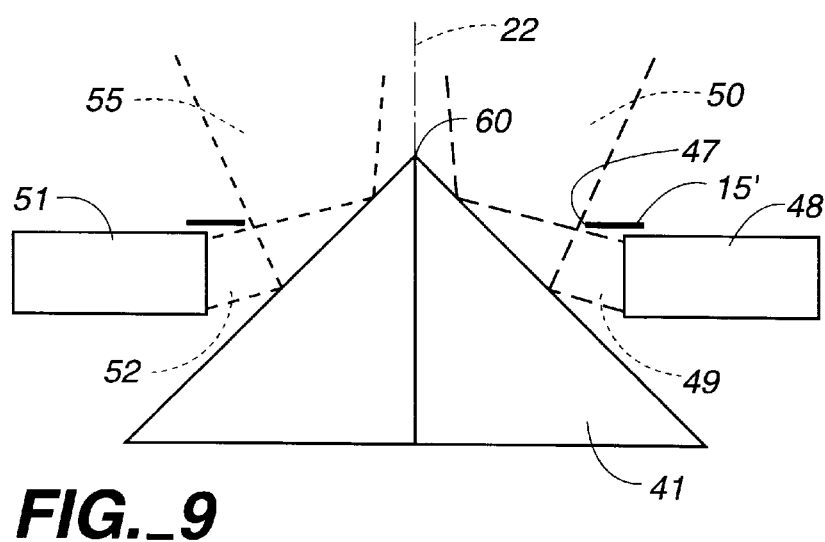
FIG._9

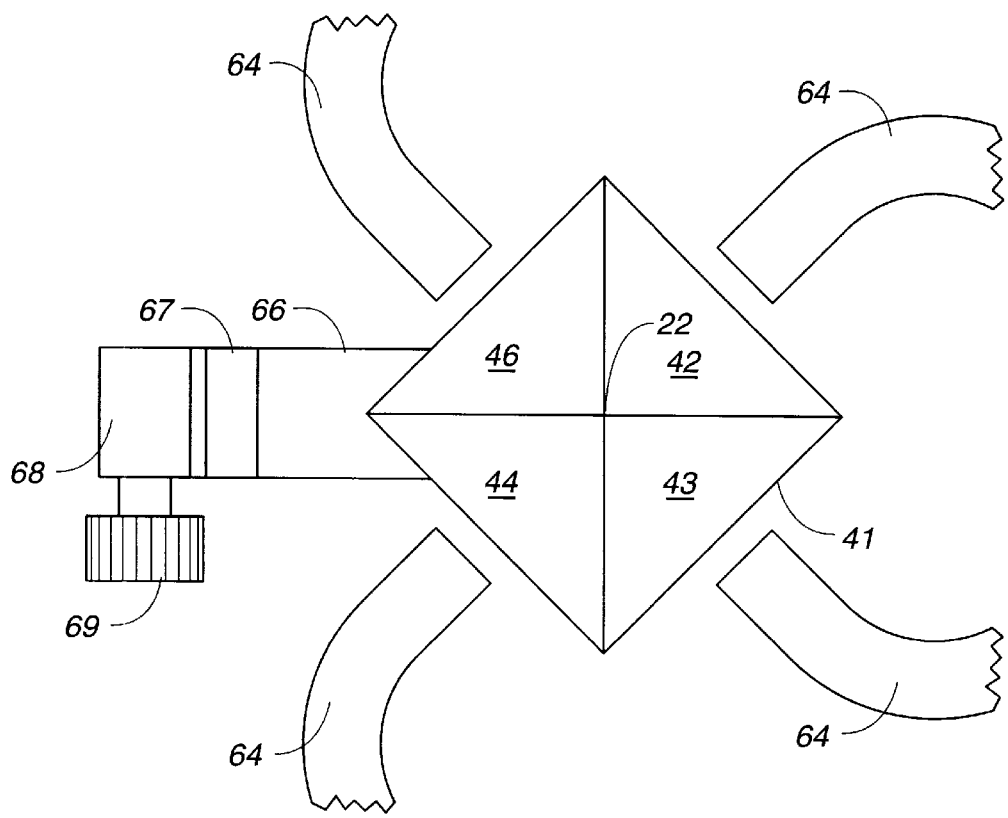
FIG._10
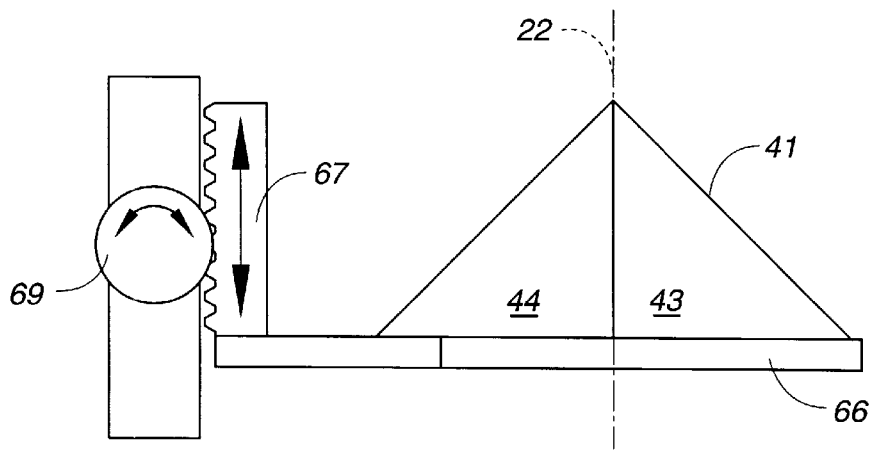
FIG._11

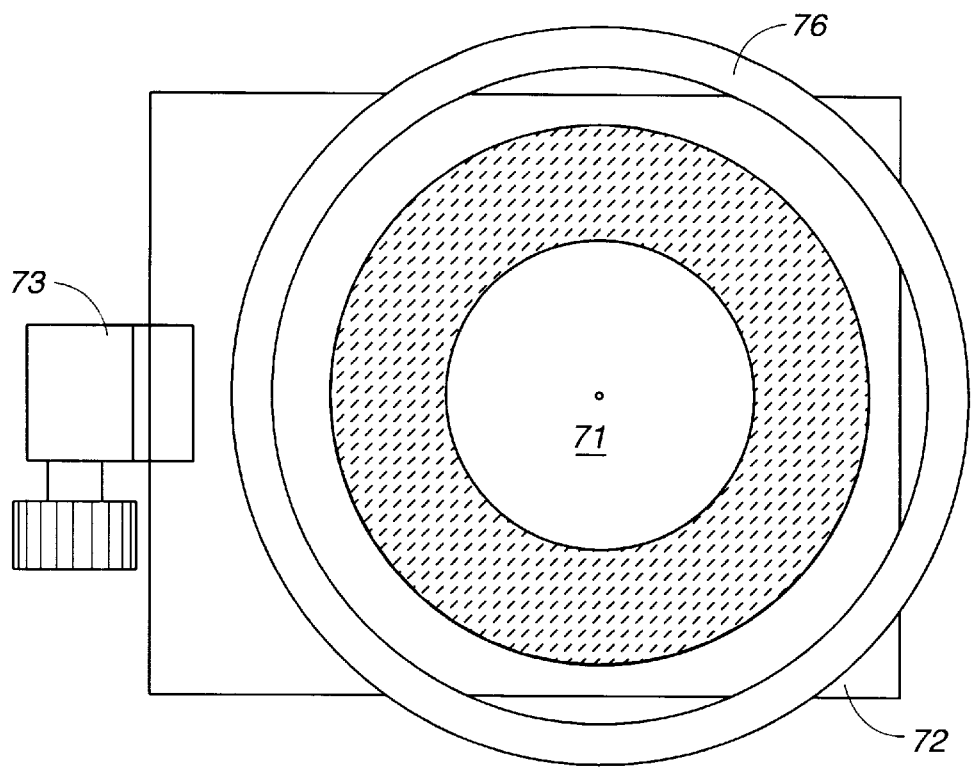
FIG._12
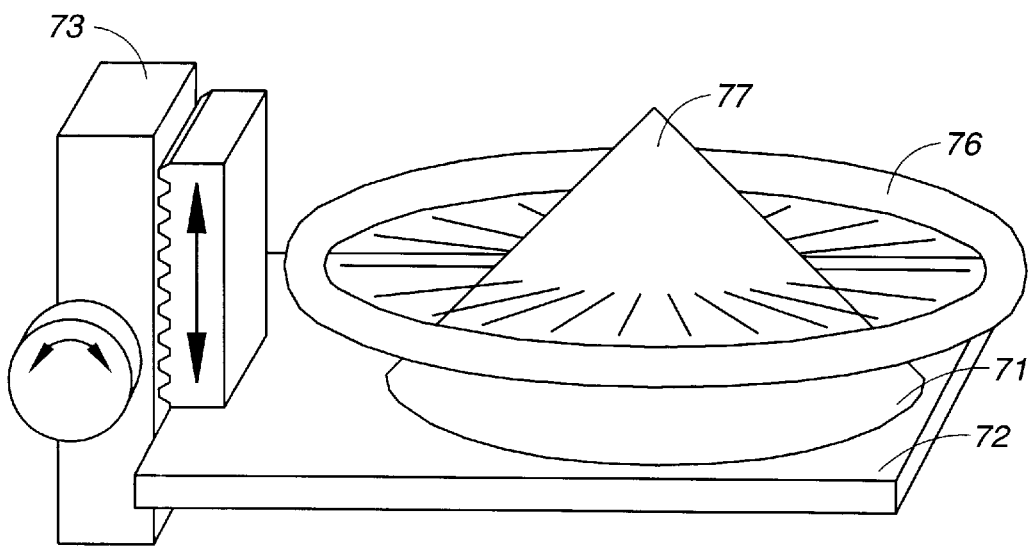
FIG._13

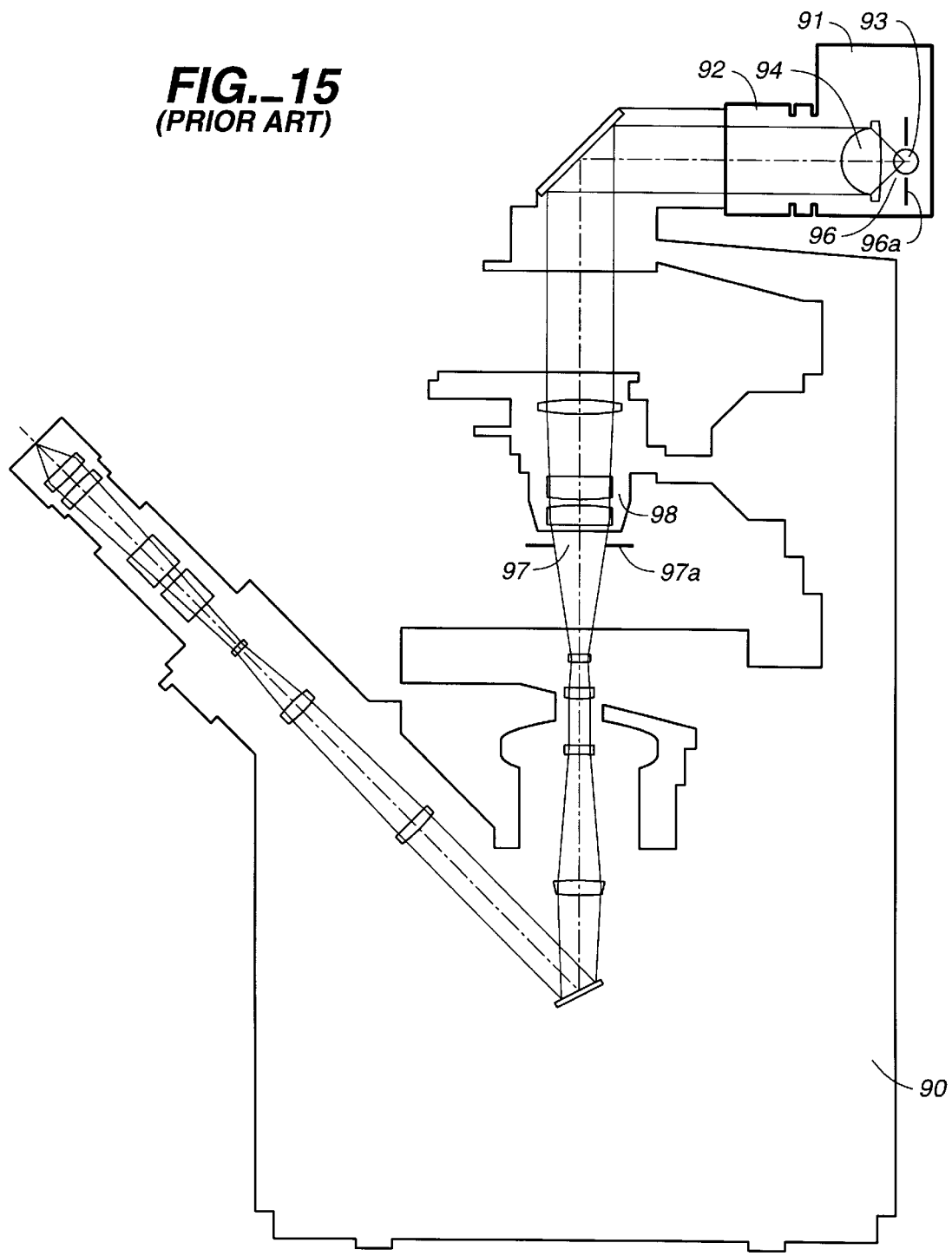
FIG._15
*(PRIOR ART)*

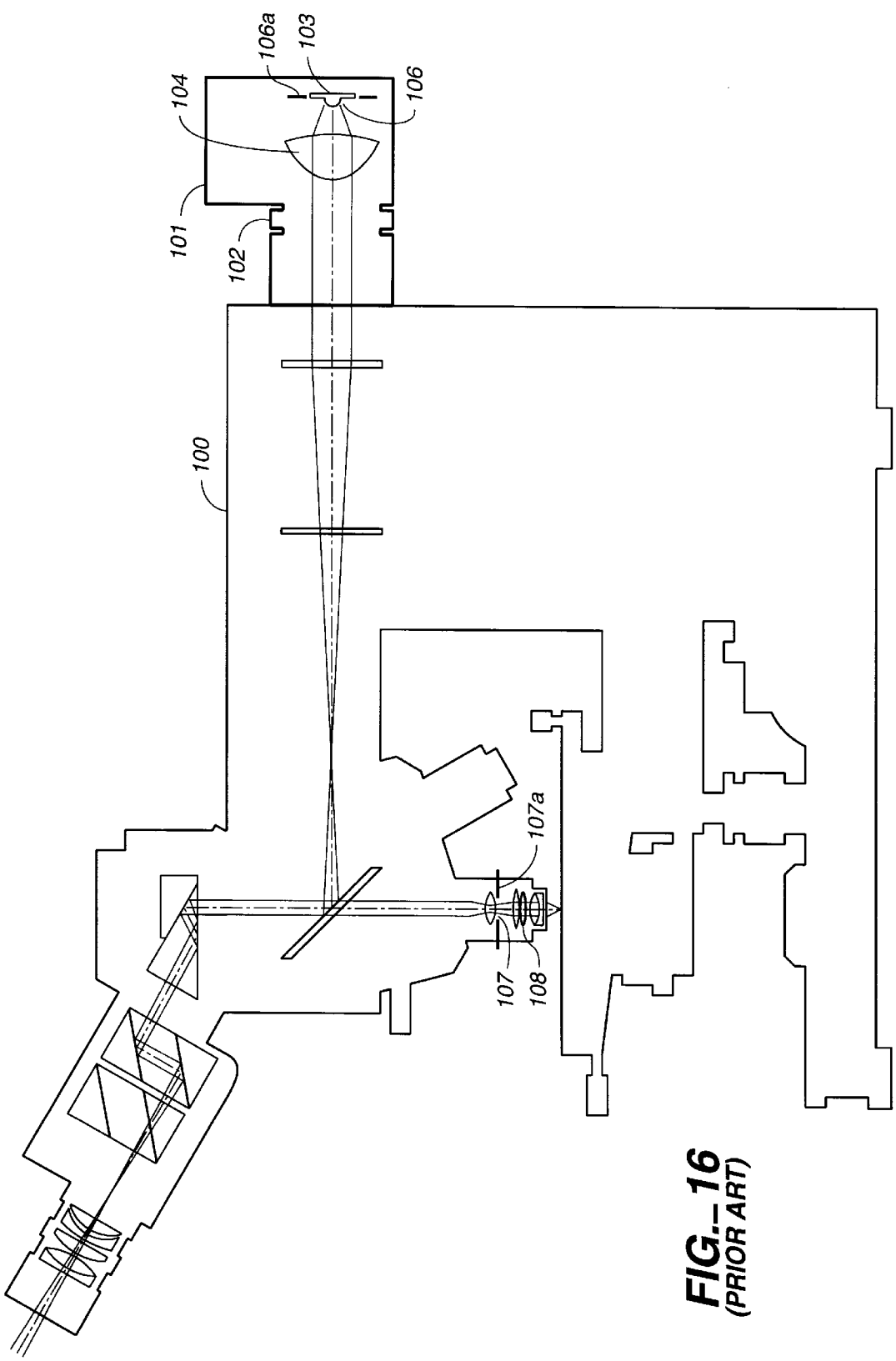
FIG._16
(PRIOR ART)

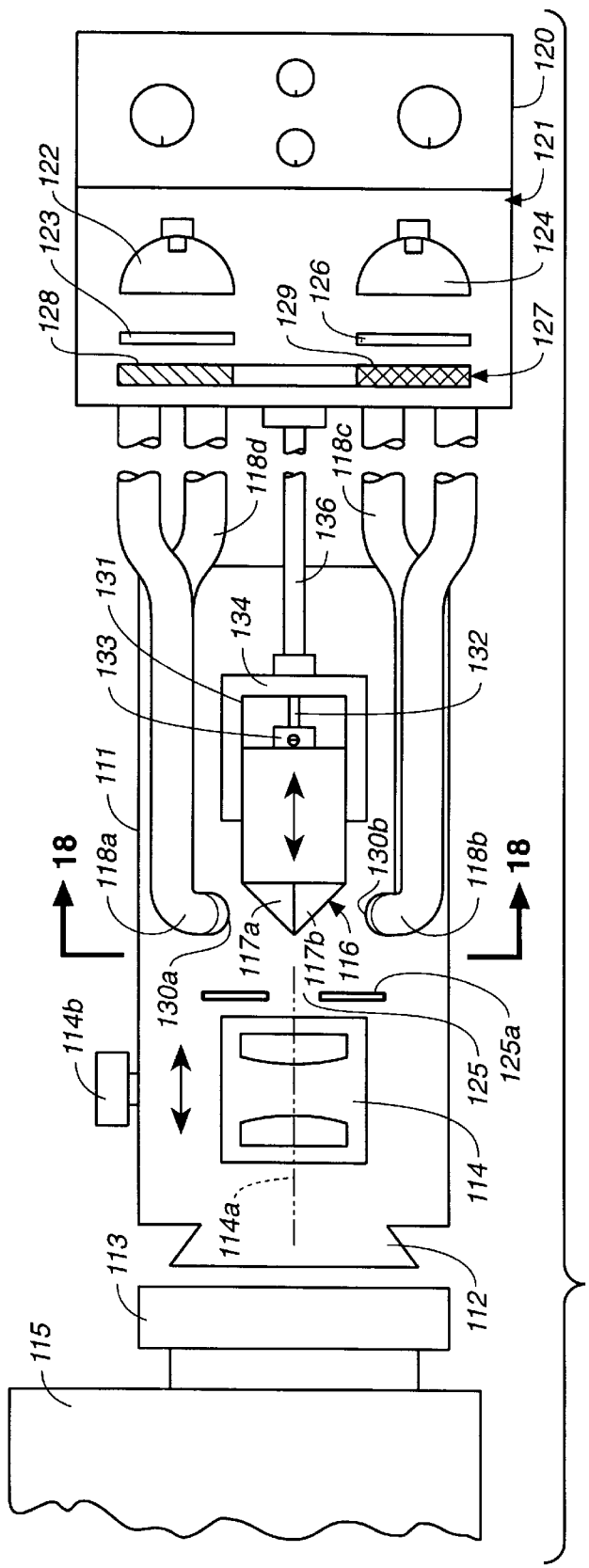
FIG._17
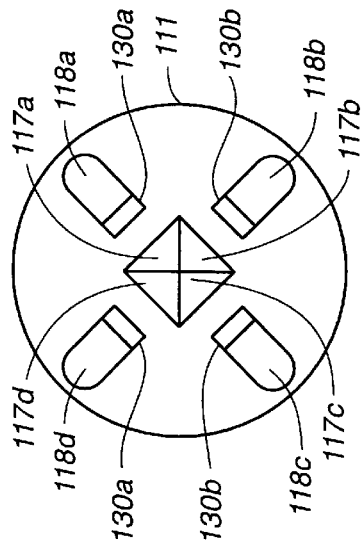
FIG._18

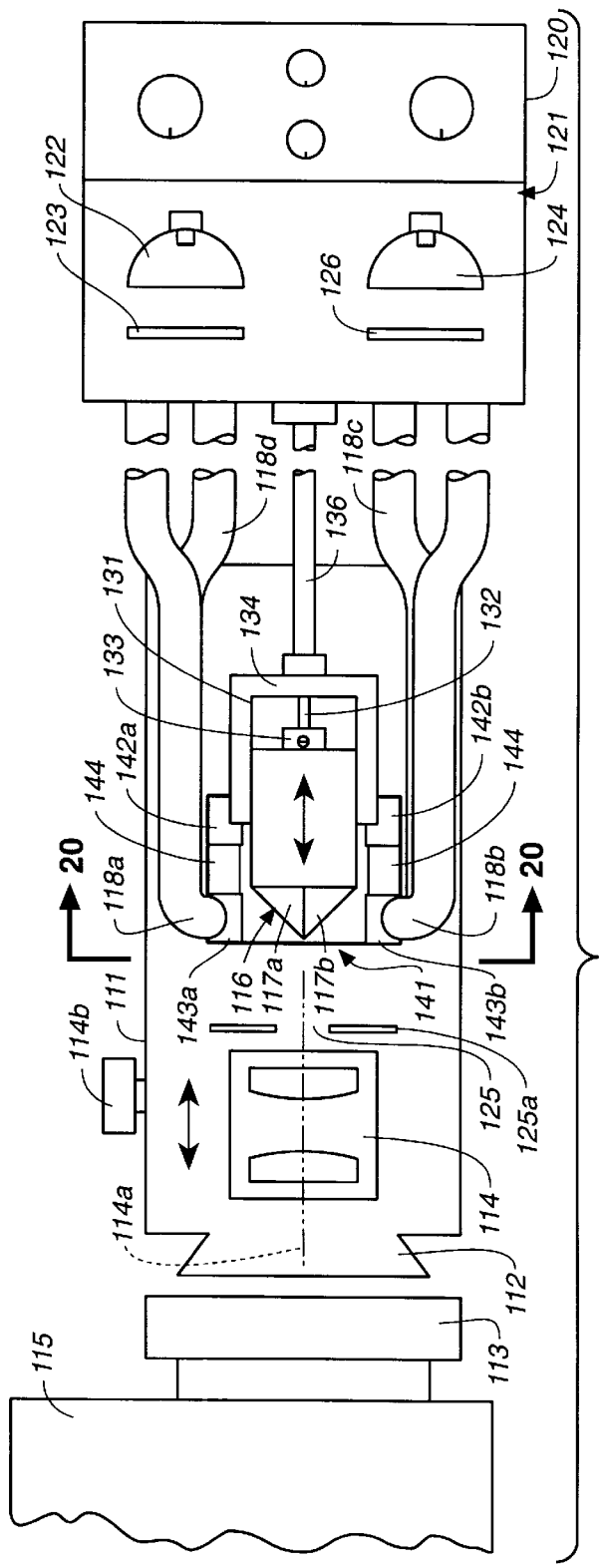
FIG._19
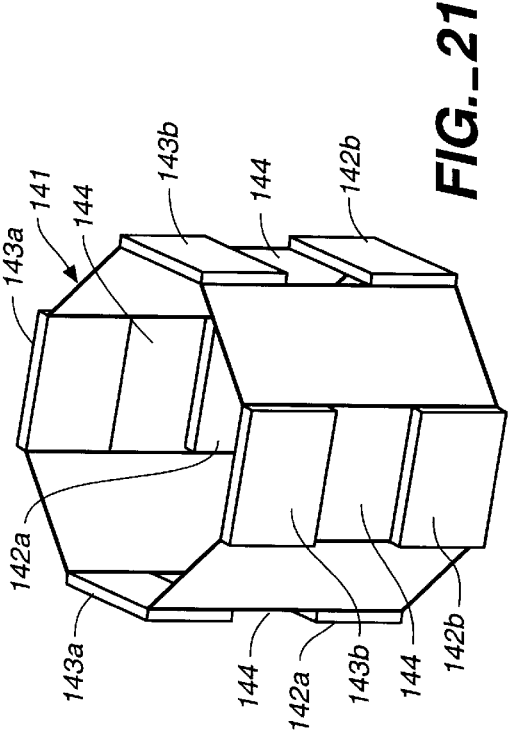
FIG._21
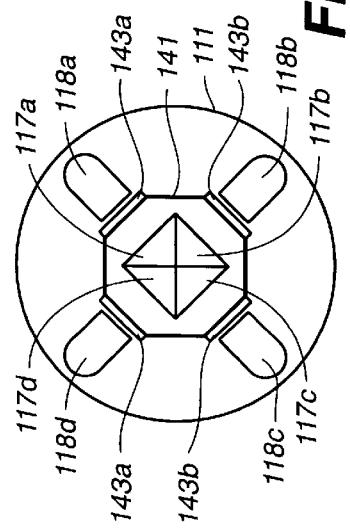
FIG._20

CENTER MASKING ADD-ON ILLUMINATOR

This is a continuation-in-part application of my application Ser. No. 08/328,846 for CENTER MASKING ILLUMINATION SYSTEM AND METHOD, filed Oct. 25, 1994, and now U.S. Pat. No. 5,684,626, issued on Nov. 4, 1997.

BACKGROUND OF THE INVENTION

The present invention relates to illumination systems and, in particular, to an illuminator for light microscopes which provides center masking (masking the central area of the condenser) apparatus. The terms "mask" and "masking" as used herein refer to any method or device which has the effect of permitting or directing illumination light onto some areas of a condenser lens and preventing other areas of the condenser lens from receiving all or some of the available illumination light. When using the term "condenser lens," it will be understood that, in the context of a reflection microscope in which the present invention is operable, the condenser lens and the objective lens refer to the same focusing lens.

The idea of improving resolution and contrast in a light microscope by preventing areas of a condenser lens from receiving full illumination (center masking) has been discussed for many years, but has never been successfully incorporated into a commercial microscope. The two main reasons for the lack of commercialization of center masking are the absence of a practical device for producing such center masking and the lack of physical space at the rear aperture of a condenser of a high power microscope in which to locate center masking apparatus.

In order for center masking to be effective, it is necessary that the size of the area of the condenser masked be carefully matched to both the objective lens being used and the specimen under investigation. Too much or too little center masking can have a noticeable effect and, in some cases, even degrade the image relative to conventional axial illumination. Thus, to be fully effective, a center masking illumination system should provide continuous masking over a significant range, from very little masking (preferably zero) to a significant amount of masking, and be useful with a wide variety of commonly used condensers including high power condensers, as well as condensers with physically inaccessible rear apertures.

Mechanical devices are known which can provide center masking by expanding or contracting an opaque mask disposed at the center of the rear aperture of a condenser. These devices, which have been designed to occlude all illumination on a path directly to the objective to provide dark-field illumination, at their minimum possible occlusion, still provide too much center occlusion which, in many cases, can degrade the image rather than produce image enhancement. These prior art devices are also incompatible with condensers with either too little or no space available at the rear aperture to accommodate the masking mechanism.

BRIEF SUMMARY OF THE INVENTION

The present invention provides continuous center masking over a significant range, which includes zero (no masking effect) and is compatible with any condenser regardless of the limited space available at its rear aperture. In addition, in one of its embodiments, the present invention provides illumination which comprises a plurality of independent (each with its own wave front) oblique light beams.

While almost all light microscopes have, since the time of Abbe, used an illumination beam which is axial (aligned with the axis of the objective lens) and a full cone (all of the central area of the condenser is illuminated), it turns out that both the axial alignment of such illumination and the full illumination of the condenser can be detrimental to the quality of the image. My U.S. Pat. No. 5,345,333 fully explains the advantages of oblique illumination. By masking a central area of the condenser, a former of spacial filtering is effected that enhances both contrast and resolution at the same time.

The diffraction theory of microscopic vision teaches that when examining with transmitted light an object having very closely spaced structural details, such as the markings of a diatom, the primary image at the back focal plane of the objective lens will consist of a central beam surrounded by orders of diffraction wavelets. Each concentric diffraction wavelet is made up of two or more spectra (which can be seen as brightly colored spots of light). The number and arrangement of the spectra depend on the pattern of the markings, and the wavelength of light being used. The distance of the diffraction wavelets from the central beam is greater the finer the markings on the specimen (the smaller the spacing between structural details).

The diffraction theory further teaches that in order to resolve fine details in the specimen, it is necessary to collect and recombine at least one order of wavelets with the central beam (zeroth order) or any two successive orders of wavelets. The more successive orders of wavelets recombined with the zeroth order, the more the resolution and sharpness of the image increases.

By reducing the magnitude of the zeroth order wavelets relative to the higher order wavelets, the higher order wavelets are able to make a greater contribution which results in an image of greater contrast and resolution. Masking the right amount of the center of the condenser has the dual effect of reducing the relative magnitude of the zeroth order wavelets without losing its information, and of enhancing the effect of the oblique rays of the illumination beam which increases the number of higher order wavelets forming the image. Contrast and resolution are thus increased.

The present invention is embodied in both apparatus and methods and has as one of its essential elements the precise masking of the central area of a condenser lens over a continuous range, including zero, to increase contrast and resolution. Except where dark-field is desired, the degree of masking of the center of the condenser is limited to permit illumination to travel directly from the condenser to the objective to form a bright field image. Since the outer diameter of the area of the condenser that sees illumination light is unaffected by the center masking, the numerical aperture (NA) remains maximal.

In one embodiment of the present invention, an image of the rear aperture of the condenser is created at a conjugate plane remote from the condenser lens (e.g., between the condenser lens and the light source) where there is physical space to locate apparatus for shaping and manipulating (masking) the illuminating light beam.

In another embodiment, the invention is in the form of an attachment that replaces the standard illumination source of any microscope. Since the filament of a standard microscope light source is typically located at a conjugate plane of the rear aperture of the condenser lens, it is an advantageous location for the invention.

One embodiment of the invention includes a plurality of independent (having distinguishable wave fronts) light beams which are oblique to the optical axis of the objective and which can be manipulated to mask the central area of the condenser over a range that includes zero. This embodiment of the invention is described and illustrated, both with the invention located at a conjugate aperture plane between a light source and the condenser, as well as the invention replacing the light source and being located at the conjugate aperture plane of the light source.

It is an object of the present invention to provide an improved illumination system for a transmitted light microscope in which enhanced resolution and/or contrast are achieved by center masking of the condenser.

It is another object of the present invention to provide a method of illuminating a specimen to be observed by a microscope using spatial filtering in which a particular area or areas of a condenser are masked to increase image resolution and contrast.

Another object of the invention is to provide a microscope wherein an image of the aperture of the condenser lens is created at a conjugate plane remote from the condenser lens where there is space to locate apparatus for masking the illuminating beam of the microscope.

Yet another object of the invention is to provide a microscope having a condenser lens and an objective lens with an illumination system that includes a plurality of independent light beams that are directed onto the condenser lens and travel to the objective lens by paths that are oblique to the optical axis of the objective lens and wherein a central area of the condenser is masked.

Still another object of the invention is to provide such an illumination system wherein the size of the effective central masking of the condenser lens is continuously variable over a range that includes zero.

A further object of the invention is to provide masking apparatus for a microscope condenser lens including a variable size central mask and a variable size peripheral mask (iris).

Another object of the invention is to provide a method of enhancing the image of a specimen viewed by a transmitted light microscope including creating an image of the rear aperture of the microscope condenser lens at a location remote from the condenser lens, masking the central area of the condenser lens at the image of the aperture and varying the size of the central mask to optimize the image.

Another object of the invention is to provide a center masking device, as referred to above and described in detail below, which is attachable at the illumination port of a conventional transmitted, inverted or reflection microscope as a replacement for the microscope's illumination system.

DESCRIPTION OF THE DRAWINGS

The foregoing and other objects, aspects and advantages of the invention will be better understood from the following detailed description of the preferred embodiments of the invention with reference to the drawings in which:

FIG. 1 is an optical schematic illustration showing basic microscope optical structure in which the invention resides and a relay system for creating a conjugate image of the rear aperture of the condenser lens to a more convenient location in space between the condenser and light source (conjugate plane);

FIG. 2 is a side view of a mask wheel and housing;

FIG. 3 is a plan view of the mask wheel of FIG. 2 showing a plurality of different size masks;

FIG. 4 is a top view of the illuminated pyramid mirror of FIG. 5 showing illumination light directed onto a conjugate aperture;

FIG. 5 is a schematic side view of the mask of the present invention in the form of a four-faced pyramid mirror illuminated by two light beams;

FIG. 6 is the same as FIG. 4, with the mirror and light source in a different relative position (mirror below light sources);

FIG. 7 is the same as FIG. 5, with the mirror and light source in a different relative position (mirror below light sources);

FIG. 8 is the same as FIG. 4, with the mirror and light source in a different relative position (mirror above light sources);

FIG. 9 is the same as FIG. 5, with the mirror and light source in a different relative position (mirror above light sources);

FIG. 10 is a top view of a pyramid mirror of the invention shown with four light sources and a rack and pinion for moving the mirror;

FIG. 11 is a side view of FIG. 10 without the light sources shown;

FIG. 12 is a top view of a cone mirror and ring light directed onto a conjugate aperture;

FIG. 13 is a side view of FIG. 12;

FIG. 15 is a side view of a typical epi illuminated, inverted, transmitted-light microscope;

FIG. 16 is a side view of a typical epi illuminated, reflected-light microscope;

FIG. 17 is a semi-schematic side view of the illuminator of the invention which attaches to the microscope illumination port; and FIG. 18 is a section of FIG. 17 taken along line 18—18.

FIG. 19 is a semi-schematic side view of an alternative embodiment of the illuminator of FIG. 17 having an alternative filter arrangement;

FIG. 20 a sectional of FIG. 19 taken along the line 20—20; and

FIG. 21 is a perspective view of the filter carousel of the embodiment of FIG. 19.

DETAILED DESCRIPTION OF THE INVENTION

Figure 14:
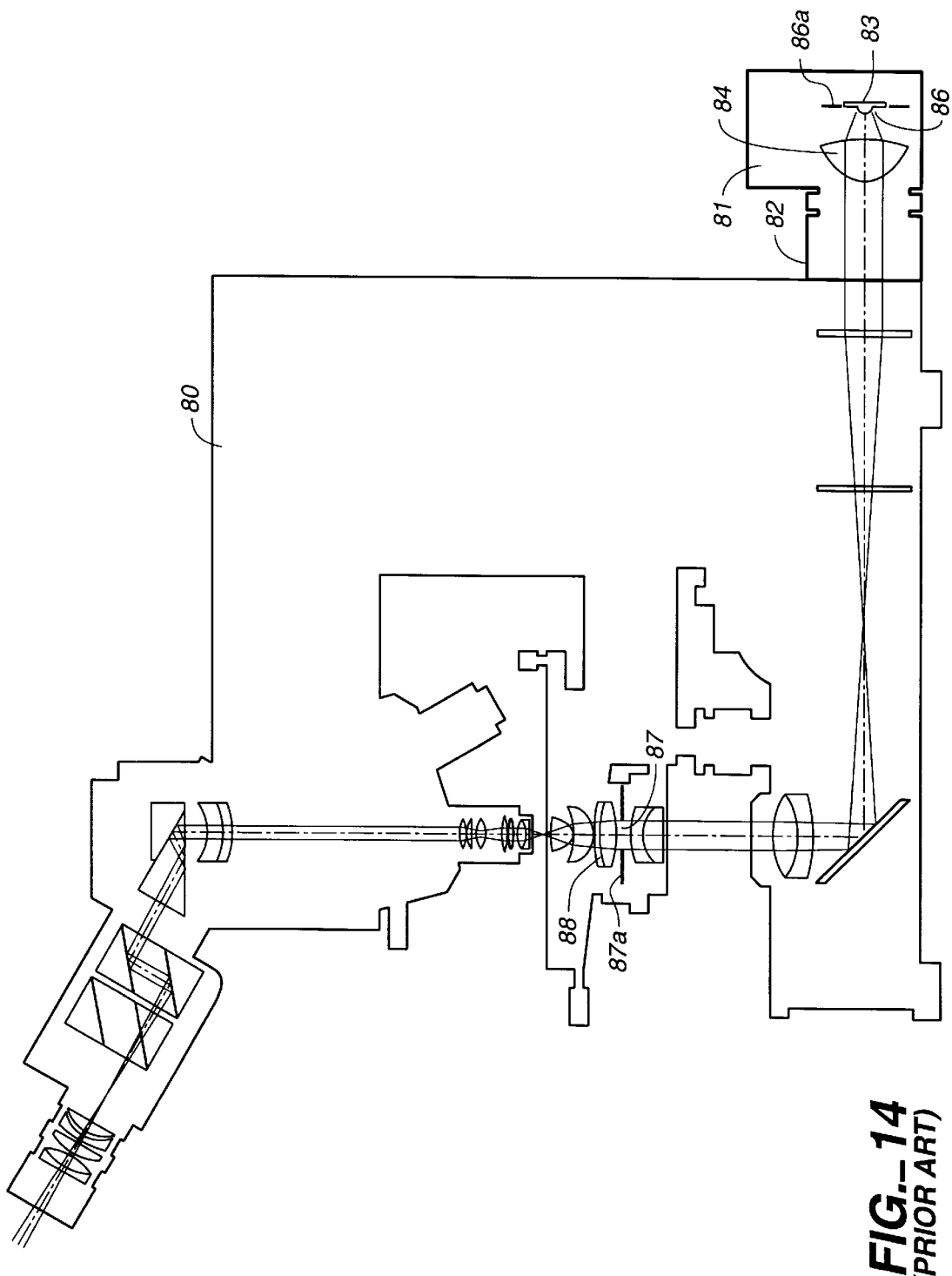
FIG. 14 is a side view of a typical epi illuminated, upright, transmitted-light microscope.

Referring to FIG. 1, a condenser lens 11 (condenser), an objective lens 12 (objective) and eyepiece 13 form the basic optics of a transmitted light microscope as is well know in the art. Condenser 11 and objective 12, as well as eyepiece 13, are, for simplicity and convenience, depicted as a single lens or doublet lens element, although it is not intended that such optical elements be restricted to simple lens design embodiments. It is typical, for example, for a condenser lens to comprise several pieces of glass and frequently incorporates other elements as well, such as an iris diaphragm. Thus, throughout this description, wherever reference is made to an objective lens, a condenser lens, relay lenses or an eyepiece, it is to be understood that the reference is to any suitable optical configuration known in the art and not to only the lens configurations shown.

A beam 10 from a light source 40 illuminates the condenser 11 which focuses the light onto an object (specimen) 14. The beam 10 then diverges onto the objective lens 12 which projects an image of the specimen onto the eyepiece 13 which further magnifies the image so an observer 16 is able to see a sharp image of the specimen 14. The location at which the condenser lens 11 focuses light onto the specimen 14 is commonly referred to as the specimen plane or image plane I. At other locations in the system, the image of the specimen is also in focus such as at plane $I_1$ between the objective 12 and the eyepiece 13 and at the plane $I_2$ of the retina 17 of the eye 21 of the observer 16, or alternatively, the film plane of a camera. The planes $I_1$ and $I_2$ are conjugate planes of the image plane I, and as such, whatever is in focus at plane I will be in focus at planes $I_1$ and $I_2$, and what is not in focus in plane I will not be in focus at planes $I_1$ and $I_2$.

The illumination beam 10 passes through the condenser 11 at what is commonly referred to as the rear aperture 15 of the condenser which is located at the aperture plane A. Like the image plane I, the aperture plane A also has conjugate planes within the system where the aperture plane is in focus. The other aperture planes include the objective aperture $A_0$ and aperture plane $A_1$ at the pupil 18 of the eye 21. The aperture plane A is not in focus at the image plane I or its conjugate planes $I_1$ and $I_2$, and the image plane I is not in focus at the aperture plane A or its conjugate planes $A_1$, $A_2$, and $A_0$. Consequently, it is possible, for example, to insert illumination beam masking apparatus at the aperture plane A to control the areas of the condenser 11 that are illuminated to effect resolution, contrast and depth of field without such beam-shaping elements being visible to the observer 16 at the image plane I or conjugate planes $I_1$ and $I_2$.

One such masking device commonly known in the art and frequently built into condenser lenses at or near the rear aperture is an iris diaphragm (iris) 19 which typically provides a variable diameter opening through which the periphery of the illumination beam 10 is restricted from passing through the condenser 11. Put somewhat differently, the iris 19 functions to determine the maximum diameter of the condenser 11 that receives illumination light 10. It is well known in the art that closing down an iris to reduce the outer area of the condenser illuminated decreases resolution of the image, but at the same time, increases contrast and depth of field due to a reduction in the numerical aperture (NA) of the condenser. Because iris 19 resides at the aperture plane A (not shown exactly at the aperture plane A for purposes of illustration and clarity), the observer 16 is unaware of the changes in the diameter of the illumination beam 10 resulting from changes of the setting of the iris 19, other than its effect on the resolution, contrast and depth of field of the image. That is, the observer does not see a change in the diameter of the field of view due to a change in the diameter of the illumination beam 10 at the condenser 11.

Because, typically, there is little or no space at the rear aperture 15 of condenser 11 in which to locate masking apparatus, other than a simple iris, relay lenses 41 are located optically between the condenser 11 and the light source 40 to create an image 15' of the condenser rear aperture 15 at a plane $A_2$ which is conjugate to plane A and at a location where there is ample space for masking apparatus. Locating masking apparatus at plane $A_2$, has the same effect on the condenser 11 as masking apparatus located at the condenser rear aperture 15 itself. Because of the space available at conjugate plane $A_2$, more elaborate masking apparatus can be used in the system, as compared to that which will fit in the limited space at the rear aperture 15.

The numerical aperture (NA) of the condenser, which is a measure of the maximum angle of a light beam from the condenser to the specimen 14, is inversely proportional to depth of field. Thus, as is well known, closing the iris 19 reduces the numerical aperture of the condenser and increases contrast and depth of field. But, as the iris is closed, resolution is sacrificed (decreased). Thus, prior art systems typically require a trade-off between resolution, on the one hand, and contrast and depth of field, on the other. The art of microscopy with prior art microscopes frequently involves choosing the correct balance between depth of field and resolution to obtain the best possible image of the object under investigation. With the present invention, the microscopist can maximize resolution, contrast and depth of field for a given specimen and objective lens.

Referring, in addition, to FIGS. 2 and 3, a transparent mask wheel 31 formed of a clear glass is rotatably disposed within a mask wheel frame (turret) 32 for rotation about the wheel's central axis 33. Applied to the surface 34 of the mask wheel 31 are a plurality of opaque or semi-opaque, disc-shaped masks 36 of different diameters. While opaque masks are illustrated by way of example, the mask 36 may alternatively be made of filter material, such as neutral density filters, so as to only reduce the intensity of the illumination (rather than occlude it altogether) in a given area of the condenser aperture 15. While masks of circular geometry are illustrated by way of example, it will be apparent to those skilled in the art that the invention is not so limited and that masks of different geometry are within the scope of the invention.

The mask wheel 31 is advantageously disposed immediately adjacent to the condenser rear aperture 15 (FIG. 1) so that, as the wheel is rotated about its axis 33, the various circular masks 36 are presented at the rear aperture 15. The wheel 31 can also be disposed at the conjugate image 15' of the rear aperture 15 and produce the same results since image 15' is at a conjugate plane of the aperture plane A.

Although the mask wheel 31 does not provide continuous center aperturing, it does permit central masks 36 of different sizes (or different shapes and densities) to be easily and quickly coupled with condenser lens 11. In this way, the best available and most effective center mask 36 for the objective lens and the specimen under investigation can be readily determined empirically by rotating the wheel 31 until the best image is seen. Because the masks 36 are at either the aperture plane A or a conjugate plane $A_2$ of the aperture plane A, the placing of a mask 36 in the optical path of the microscope does not show up at the observation image plane $I_2$. Zero aperturing is provided by positioning the wheel 31 so that no disc 36 is aligned with the condenser 11.

For each specimen/objective combination, there is an optimum amount of center masking of the condenser that will produce the best image, and it has been observed that even slight variations from that optimum can result in significant degradation of the image. Thus, in the preferred embodiment of the invention, center masking is continuous so that very precise matching of center masking to the particular specimen/objective combination can be achieved. For some specimens, it is advantageous to vary the amount of illumination light excluded from the central area of the condenser, as well as the size of that area. It has been found that, in such cases, the image is enhanced by allowing a fraction of the normal illumination to reach the center region of the condenser, rather than exclude all light therefrom.

Referring to FIGS. 1,4, and 5, a pyramid-shaped mirror 41 having four reflective surfaces 42, 43, 44, and 46 is disposed adjacent to aperture 15' which is at the conjugate aperture plane $A_2$. Illumination light at the aperture 15' is also effectively the illumination at the rear aperturing 15 of the condenser 11 itself.

When the pyramid mirror 41 is used, the light source 40 is replaced by a multiple light source, such as illuminated fiber optic guides 48 and 51. By way of illustration, two of four possible light sources are shown. Light source 48 directs a light beam 49 onto mirror surface 42, while light source 51 directs a light beam 52 onto mirror surface 46. Mirror 41 is movable along its axis 22 relative to light sources 48 and 51. While light sources 48 and 51 have been indicated as illuminated fiber optic guides, the illumination of various surfaces of the mirror 41 can be achieved with other light sources which are well known to those skilled in the art. Thus, the invention is not limited to the use of fiber optic guides as the only means for providing illumination light for the system.

The beams 49 and 52 are directed onto, and reflect off of, the mirror surfaces 42 and 46, respectively, as reflection beams 50 and 55, respectively. The size of the beams 49 and 52 when they reach the mirrored surfaces 42 and 46 is such that, in one position of the mirror 41 relative to the light sources 48 and 51 (that shown in FIG. 5), both the apex 60 of the mirror 41 and the periphery 47 of conjugate aperture 15' are illuminated. In that position of mirror 41, reflection beams 50 and 55 illuminate all of quadrants 57 and 58 of the aperture 15', as seen in FIG. 4. In this position, there is zero center masking in quadrants 57 and 58, as no part of the condenser in those quadrants has been prevented from receiving any illumination light.

Referring to FIGS. 6 and 7, the mirror 41 is there shown in a position relative to the light sources 48 and 51 that is below the position shown in FIG. 5. Lowering the mirror 41 has the effect of reducing the angle of the reflection beams 50 and 55 so that they no longer include the periphery 47 of the projected aperture 15'. Under these conditions of illumination, only the central area of quadrants 57 and 58 of aperture 15' are illuminated—the area of the quadrants adjacent the aperture perimeter 47 is not illuminated. Thus, lowering the mirror 41 relative to the light sources 48 and 51 has a similar effect to closing down an iris at the aperture plane to reduce the diameter of the illuminating beam that is seen by the rear aperture of the condenser lens and objective lens. As the term "mask" is used herein, the pyramid mirror 41 is a mask in that it prevents certain areas of the condenser lens from receiving light from an illumination source.

Referring to FIGS. 8 and 9, the mirror 41 is shown in a position relative to the light sources 48 and 51 that is above that position shown in FIGS. 4 and 5. Raising the mirror 41 to a location where beams 49 and 52 do not illuminate an upper portion of the pyramid mirror 41 (including the apex 60) results in the central portion of the quadrants 57 and 58 being masked (not getting illuminated). The reflection beams 50 and 55, however, do include the periphery 47 of the aperture 15' so the full diameter of the conjugate aperture 15' is illuminated.

The particular shape of the aperture (mask) that is formed by the pyramid mirror 41 as it is positioned to prevent illumination from reaching the central area of the aperture 15' is particularly advantageous in that the periphery 47 of the aperture 15' continues to be illuminated, even as the central area that is not illuminated increases. In addition, the separate faces of the mirror 41 each produce an oblique beam with an independent wave front that superposes with the other beams from other faces of the mirror 41.

By raising and lowering the mirror 41, continuous center masking over a range that includes zero is achieved. The system allows traditional full axial illumination (no masking as seen in FIG. 4), center masking central areas of the condenser as seen in FIGS. 8 and 9 (to the extreme of a type of dark-field illumination), and peripheral aperturing (equivalent to an iris diaphragm) as seen in FIGS. 6 and 7.

The advantages of center masking (raising the mirror 41 above the no-aperturing position) over peripheral aperturing (lowering the mirror 41 below the no-aperturing position) are: (1) the N.A. is reduced with peripheral aperturing, whereas it remains maximal with center masking; (2) with center masking, the illuminating light rays that ultimately reach the objective are all oblique relative to the optical axis of the objective lens, increasing the number of higher order diffraction wavelets that form the image, thereby increasing resolution; and (3) center masking reduces the relative magnitude of the zeroth order wavelet (raises the relative magnitude of the higher order wavelets), thereby increasing contrast.

Because the pyramid mirror 41 and the associated light sources 48 and 51 are located at a conjugate aperture 15' of the rear aperture 15 of condenser 11 where there is unobstructed space for the mirror to be raised and lowered (see FIG. 1), it is possible to raise part of the mirror 41 above the conjugate aperture 15' (see FIG. 9) to the extent required to produce the center masking necessary. This would not be possible if the mirror 41 was located at the rear aperture 15 of the condenser 11 itself, since the mirror would, for many adjustments, want to occupy the same space occupied by the lens elements of condenser 11.

It is the movement of the mirror 41 relative to the light sources 48 and 51 that produces the variable masking described above. Thus, the mirror can be fixed and the light sources 48 and 51 moved in a direction parallel to the axis 22 of the pyramid mirror 41, or the light sources 48 and 51 can be fixed and the pyramid mirror 41 moved in a direction along its axis 22. Although both arrangements are within the scope of the present invention, where there are a plurality of light sources, it has been found more practical to raise and lower the mirror 41 to produce the required masking.

The invention has thus far been described with reference to an arrangement of parts that includes two light sources directing beams onto adjacent faces of a four face pyramid mirror. In the preferred embodiment, there are four light sources illuminating all four faces of the mirror.

Referring to FIGS. 10 and 11, four fiber optic light sources 64 are positioned to direct a light beam onto each of the four faces 42, 43, 44 and 46 of the mirror 41. Once again, while fiber optic light guides offer several advantages, other sources of illumination light are well know in the art and can be used with the present invention. By selecting particular light sources 64 to be operative (provide a light beam), and by varying the intensities of the operative light sources 64, a wide variety of illumination combinations is possible. With the present invention, a microscopist is able to carefully tailor the illumination to the specimen, objective lens and type of investigation being conducted to obtain the image desired. Contrast, resolution, depth of field and shadowing are all variables the present invention puts under control of the microscopist. In general, the best results are achieved for two-dimensional viewing when two light sources 64 illuminate adjacent faces (43 and 44, for example) of the mirror 41 (the other two faces are not illuminated at all). For 3-D viewing, all four light sources 64 can be used to illuminate all four faces of the mirror 41, with adjacent pairs of mirror faces providing the image for each eyepiece of a binocular viewing system (not shown). Other combinations may prove more advantageous for particular circumstances.

A number of mechanical or electrical mechanical devices for raising or lowering the pyramid mirror 41 can be imagined, are well within the skill of the art and, as such, form no part of the invention. Such systems require that the pyramid mirror be capable of being raised and lowered in small increments and that, once located at the desired position, the mirror remains there until moved to a new position. One such system is shown and described with reference to FIGS. 10 and 11.

The pyramid mirror 41 is affixed to a base 66 which, in turn, is affixed to a vertically-oriented rack member 67. Rack member 67 combines with a pinion 68 which is turned by a knob 69 attached to the pinion 68. By turning the knob 69, the pinion is rotated, causing the rack 67 to move up or down depending on the direction the knob is turned, and in turn, the base 66 moves up and down with the rack 67 carrying with it the pyramid mirror 41. The rack and pinion members permit the mirror 41 to be easily vertically adjusted relative to the fixed light sources 64 and thereby achieve the results described above. Other arrangements using a ramp and cam, or a pneumatic or hydraulic ram, to name only two, are possible and any such mechanism can be oriented to suit the conditions and still produce the desired relative movement between the mirror 41 and its associated light sources 64. The particular mechanical or electromechanical system employed to raise or lower the mirror 41 does not form any part of the invention, as such systems are well know to those skilled in the art.

The present invention has been described with reference to a pyramid mirror having four faces. Because outstanding results are achieved for two-dimensional viewing by using adjacent faces of a four face pyramid mirror, and 3-D viewing is achieved by using adjacent pair faces of a four face pyramid mirror for creating left and right eye views, the four face pyramid mirror shown and described is a preferred embodiment. The invention, however, is not limited to a pyramid mirror of four faces, and a pyramid of three faces or a pyramid of more than four faces may, in special cases, have advantages. Thus, the invention is not limited to a pyramid mirror of four faces, but includes pyramid mirrors having a number of different faces.

Where the number of faces of pyramid mirror 41 are infinite, the pyramid mirror becomes a cone mirror as seen in FIG. 12 and 13. By employing the combination of a ring light with a cone-shaped mirror movable relative to the ring-shaped light, continuous center aperturing, including zero, is achieved.

Referring to FIGS. 12 and 13, a cone-shaped mirror 71 is mounted on a base 72 which can be raised or lowered by the operation of a rack and pinion 73 to which the base is attached. A ring-shaped light 76 surrounds the upper portion of the pyramid mirror 71 and provides a source of illumination which is reflected by the mirror surface 77 of the cone-shaped mirror 71. Just as described in connection with the pyramid-shaped mirror 41 in FIGS. 5–10, movement of mirror 71 relative to the ring light 76 can produce center masking, peripheral aperturing, and zero masking.

While the combination of the cone-shaped mirror 71 and the ring light 76 does not provide independent wave fronts, as does the pyramid mirror combination, and thus does not have all the benefits of superposed independent wave fronts, it does provide for continuous center masking over a range that includes zero, which is an important advance in that art.

Referring to FIG. 14, a standard prior art upright transmitted-light microscope 80 has an illuminator 81 connected to the microscope at a microscope illumination port 82. Illuminator 81 includes a lamp 83 that provides light through a lamp condenser 84 to the internal optics of the microscope in a manner well known in the art.

Referring to FIG. 15, a standard prior art inverted transmitted-light microscope 90 has an illuminator 91 connected to the microscope at a microscope illumination port 92. Illuminator 91 includes a lamp 93 that provides light through a lamp condenser 94 to the internal optics of the microscope in a manner well known in the art.

Referring to FIG. 16, a standard prior art reflection microscope 100 has an illuminator 101 connected to the microscope at a microscope illumination port 102. Illuminator 101 includes a lamp 103 that provides light through a lamp condenser 104 to the internal optics of the microscope in a manner well known in the art.

In order to fully illuminate a specimen, the prior art teaches the use of internal microscope optics in combination with the lamp condenser to create an image of the rear aperture of the microscope condenser lens at a conjugate aperture plane at the illuminator lamp.

Thus, the microscope illuminator 81 of FIG. 14 has a projected image 86 of the rear aperture 87 (at aperture plane 87a) of the condenser lens 88 at a conjugate aperture plane 86a at the lamp 83 and behind the lamp condenser lens 84.

Likewise, the microscope illuminator 91 of FIG. 15 has a projected image 96 of the rear aperture 97 (at aperture plane 97a) of the condenser lens 98 at a conjugate aperture plane 96a at the lamp 93 and behind the lamp condenser lens 94.

And as would be expected, the microscope illuminator 101 of FIG. 16 has a projected image 106 of the rear aperture 107 (at aperture plane 107a) of the condenser lens 108 at a conjugate aperture plane 106a at the lamp 103 and behind the lamp condenser lens 104. It should be noted that in a reflection microscope, the condenser lens and the objective lens (which are focusing lenses) are one and the same.

By virtue of this embodiment of the invention, all of the advantages of center aperturing and multiple oblique illumination described above in connection with FIGS. 4–11 are made available in a standard microscope, such as those illustrated in FIGS. 14, 15 and 16, by replacing the standard light sources with an illuminator according to the present invention.

Referring to FIGS. 17 and 18, the add-on illuminator embodiment of the present invention includes a housing 111 having a connector 112 at one end for attachment to a microscope illumination port 113. Illumination port 113 represents any one of the illumination ports 82, 92 or 102 shown in FIGS. 14, 15 and 16, respectively. Further, port 113 represents any illumination port of a microscope designed to receive illumination from a light source and lamp condenser as described above.

Housing 111 contains a lamp condenser 114, a pyramid-shaped mirror 116 having a plurality of reflective faces 117a, 117b, 117c and 117d. A plurality of light sources 118a, 118b, 118c and 118d are fixedly disposed around and adjacent to the pyramid mirror faces whereby each light source is disposed to direct illumination onto one of the pyramid mirror faces. The light sources 118a, 118b, 118c and 118d can advantageously be fiber optic guides as shown, but are not necessarily restricted thereto. Other light sources known in the art and capable of directing illumination onto the separate faces of the pyramid mirror 116 can serve the purposes of the invention.

Illumination is provided by an illumination source 121 which is advantageously contained within a separate housing 120, and comprises a lamp 122 which directs light through a heat filter 123 to fiber optic guides 118a and 118d, and a second lamp 124 which provides light through a heat filter 126 to light guides 118b and 118c. The fiber optic guides can be long enough to span the distance between the illuminator housing 111, which is designed to be attached to the microscope, and the illumination source 121, which is advantageously designed for desk-top location. Only two light sources are shown, with each illuminating two fiber guides. Four light sources, each illuminating a different one of four light guides, is another possible embodiment. A filter carrier 127 disposed in housing 120 between the lights 122 and 124 and their respective fiber optic light guides permits the location of filters between the light sources 122 and 124 and their respective light guides for creating a variety of effects, including 3-D viewing, as more fully described above. By way of example, a filter 128 between light source 122 and fiber optic guides 118a and 118d causes the light reflected off of faces 117a and 117d of pyramid mirror 116 to be distinguishable from the light reflected off of faces 117b and 117c, which passes through filter 129 disposed between light source 124 and fiber optic guides 118b and 118c. Filters 128 and 129 could be chromatic pairs which, when used as described above, permit 3-D viewing in conjunction with corresponding filters incorporated into the microscope binocular eyepieces (not shown).

Polarizing filters can also be used but they must be located at the exit end of the fiber optic light guides. Thus, for true 3-D viewing, polarizing filters 130a are placed at the end of one pair of fiber optic light guides (118a and 118d) while polarizing filters 130b are placed at the end of the other pair of fiber optic light guides (118b and 118c ). The filters 130a and 130b are oriented so that their respective angles of polarization are 90° to each other.

Pyramid mirror 116 is slidably mounted within a carrier 131 fixedly mounted within housing 111. A positioning cable 132 is attached to the pyramid-shaped mirror 116 by a cable connector 133. The cable 132 passes through the end wall 134 of carrier 131 and through a cable sheath 136 which passes out of the illuminator housing 111 and into the illumination source housing 120 which contains the cable operating mechanism (not shown). The positioning cable 132 is operated to apply a pushing or pulling force on the pyramid mirror 116 in a manner well known in the art. When a pushing force is applied by cable 132 to the pyramid mirror 116, the mirror moves away from the end 134 of the carrier 131 and toward the lamp condenser lens 114. Because the fiber optic guides 118a, 118b, 118c and 118d are all fixedly mounted within housing 111, movement of pyramid mirror 116 along the axis 114a of condenser 114 is movement relative to the fiber optic guides. It is within the scope of the invention for the light guides 118a, 118b, 118c and 118d to be movable and the mirror 116 fixed, or both movable so long as relative movement can be effected for the reasons fully described above in connection with the other embodiments of the invention.

The adjustment of the position of pyramid mirror 116 along the axis 114a can be accomplished using mechanical, electro-mechanical, pneumatic or any other one of several well known means for providing fine linear movement. The particular transport means for changing the relative positions of the mirror 116 and the light sources 118a, 118b, 118c and 118d does not form a part of the invention.

The lamp condenser 114, together with the internal optics of the microscope 115 (as illustrated in FIGS. 14, 15 and 16), creates an image 125 of the rear aperture of the microscope condenser at a conjugate aperture plane 125a at the pyramid-shaped mirror 116 so that illumination reflected off of the faces of the pyramid mirror 116 are reflected onto the image 125 of the rear aperture of the microscope condenser lens, and movement of the pyramid mirror along the optical axis 114a of the lamp condenser 114 causes center aperturing and peripheral aperturing in precisely the same way and as fully described above in connection with FIGS. 4–11.

In order to assure that the conjugate image 125 of the rear aperture of the microscope condenser is properly located relative to the pyramid-shaped mirror 116, lamp condenser 114 is advantageously mounted for movement along its optical axis 114a. A knob 114b, which is mechanically connected to lamp condenser 114 in any one of several ways well known in the art, provides the means for adjusting the lamp condenser location and, thus, its focus.

Referring to FIGS. 19, 20 and 21, an alternative embodiment of the invention includes an octagonal filter carrousel 141 disposed between the light guides (118a, 118b, 118c and 118d) and the reflective faces of pyramid mirror 116 and is movable along the axis 114a. The carousel 141 can carry both chromatic and polarizing filters since the filters are located at the exit end of the light guides. Each alternative face of the octagonal carrousel 141 that directly faces one of the faces 117a, 117b, 117c, 117d of mirror 116 carries a filter set comprised of a chromatic filters, a polarizing filter and a through apertures (open windows). Other filters could be used as well without departing from the scope of the invention.

The carrousel 141 is mounted within housing 111 for indexed movement along axis 114a to one of three positions. The mechanical apparatus for positioning carrousel 141 can be selected form the many such mechanisms which will be known to those skilled in the art, and therefore is not shown in detail as it does it form a part of the invention.

In its first position (as shown in FIGS. 19 and 20), carousel 141 disposes contrasting chromatic filters 143a and 143b between the light guides 118a, 118b, 118c and 118d and their facing mirror reflective faces 117a , 117b , 117c and 117d. In this position two of the light guides 118a and 118d direct their light through filters 143a, while light guides 118b and 118c direct their light through filters 143b. If filters 143a are green and filters 143b red, for example, then two of the beams are chromatically contrasted from the other two beams.

In its second position (not shown) along axis 114a , carousel 141 disposes through apertures 144 between the light guides 118a, 118b, 118c and 118d and their facing mirror reflective faces 117a, 117b, 117c and 117d, in which position the mirror receives unfiltered light.

In its third position (not shown) along axis 114a, carousel 141 disposes contrasting polarizing filters 142a and 142b between the light guides 118a, 118b, 118c and 118d and their facing mirror reflective faces 117a, 117b, 117c and 117d. In this position two of the light guides 118a and 118d direct their light through filters 142a, while light guides 118b and 118c direct their light through filters 142b. If filters 142a and 142b are polarized in directions 90 degrees to one another, as is customary in the art, then two of the beams are polarized to be contrasted to the other two beams.

Before reaching the mirror 116, the light from each of light guides 118a, 118b, 118c and 118d passes through either filters 142a and 142b, filters 144a and 144b or a through aperture 143, depending on the position of the filter carousel 141 along axis 114a. In order to create 3-D viewing, the carousel 141 is moved to that position along axis 114a that disposes a filter between each light guide and the mirror 116.

Filters corresponding to those selected (either chromatic or polarizing) would, of course, have to be adapted to the microscope eyepieces (not shown) as is well known in the art. For non-filtered viewing, the through apertures 143 are aligned between the fiber optic guides 118a, 118b, 118c and 118d and the mirror 116.

The octagonal shape of the filter carousel 141 is advantageous for the embodiment illustrated but not essential. The function of selectively disposing filters between the light guides 118a, 118b, 118c and 118d and their respective mirror faces 117a, 117b, 117c and 117d as described above, can be achieved using other structures and different shapes.

Likewise, the through apertures 143 could be eliminated by simply providing for a position of carousel 141 along axis 114a in which the carousel 141 is not between the light guides 118a, 118b, 118c and 118d, and the mirror 116.

Thus, the invention having been fully described, is not to be limited to the details herein set forth, but is of the full scope of the appended claims.

What is claimed is:

1. An illuminator for attachment to the illumination port of a light microscope, comprising in combination:
    a pyramid-shaped mirror having a plurality of reflective faces;
    a plurality of light sources illuminating a plurality of faces of said pyramid-shaped mirror; and
    a housing containing said pyramid-shaped mirror and having a connector for attachment to the illumination port of the microscope.

2. The illuminator of claim 1 wherein the number of light sources is more than two.

3. The illuminator of claim 2 wherein said pyramid-shaped mirror and said light sources are mounted for relative movement.

4. The illuminator of claim 1 wherein said pyramid-shaped mirror and said light sources are mounted for relative movement.

5. The illuminator of claim 4 further comprising:
    contrasting filters disposed between said light sources and said mirror reflective surfaces whereby light from some of said light sources passes through one of said contrasting filters before reaching a mirror surface and light from other of said light sources passes through the other of said contrasting filters.

6. The illuminator of claim 5 wherein said filters are chromatic pairs.

7. The illuminator of claim 5 wherein said filters are polarizing pairs.

8. The illuminator of claim 4 further comprising:
    a filter carrier disposed between said light sources and said mirror reflective surfaces and on which are mounted both contrasting chromatic filters and contrasting polarizing filters.

9. The illuminator of claim 1 further comprising:
    contrasting filters disposed between said light sources and said mirror reflective surfaces whereby light from some of said light sources passes through one of said contrasting filters before reaching a mirror surface and light from other of said light sources passes through the other of said contrasting filters.

10. The illuminator of claim 9 wherein said filters are chromatic pairs.

11. The illuminator of claim 9 wherein said filters are polarizing pairs.

12. The illuminator of claim 1 further comprising:
    a filter carrier disposed between said light sources and said mirror reflective surfaces and on which are mounted both contrasting chromatic filters and contrasting polarizing filters.

13. An illuminator for attachment to the illumination port of a light microscope having a condenser lens with a center, an optical axis and a rear aperture at its aperture plane, and an objective lens with an optical axis, comprising in combination:
    a lamp condenser lens;
    a pyramid-shaped mirror having a plurality of reflective faces;
    a plurality of light sources illuminating a plurality of faces of said pyramid-shaped mirror; and
    a housing containing said pyramid-shaped mirror, said lamp condenser lens and said light sources and having a connector for attachment to the illumination port of the microscope wherein said lamp condenser lens is disposed to create an image of the rear aperture of the microscope condenser lens at a conjugate aperture plane within said housing and at or near said pyramid-shaped mirror when said housing is connected to the illumination port and, further, wherein light from the faces of said pyramid-shaped mirror is directed onto the image of the rear aperture of the microscope condenser lens at the conjugate aperture plane.

14. The illuminator of claim 13 wherein light directed onto the image of the rear aperture of the microscope condenser lens ultimately travels to the microscope objective lens along paths that are oblique to the optical axis of the microscope objective lens.

15. The illuminator of claim 13 wherein said pyramid-shaped mirror and said light sources are mounted for relative movement in two opposite directions; and
    said pyramid-shaped mirror and said light sources have a first relative position at which the image of the aperture of the condenser lens is fully illuminated by light reflected from the faces of said pyramid-shaped mirror and wherein relative movement in one direction away from said first position masks illumination from an area of the image of the rear aperture of the microscope condenser lens that includes its center.

16. The illuminator of claim 15 wherein continued movement away from said first position continuously increases the area of the image of the aperture of the microscope condenser lens that is masked.

17. The illuminator of claim 16 where relative movement between said mirror and said light sources away from said first position in the opposite direction masks illumination from an area of the image of the rear aperture of the microscope condenser lens that is adjacent to the perimeter of the image of the aperture and does not include its center.

18. The illuminator of claim 17 wherein continued movement away from said first position in the opposite direction continuously increases the area of the image of the rear aperture of the microscope condenser lens that is masked.

19. The illuminator of claim 13 further comprising:
    contrasting filters disposed between said light sources and said mirror reflective surfaces whereby light from some of said light sources passes through one of said contrasting filters before reaching a mirror surface and light from other of said light sources passes through the other of said contrasting filters.

20. The illuminator of claim 19 wherein said filters are chromatic.

21. The illuminator of claim 19 wherein said filters are polarizing.

22. The illuminator of claim 13 further comprising:

a filter carrier disposed between said light sources and said mirror reflective surfaces and on which are mounted both contrasting chromatic filters and contrasting polarizing filters.

23. An illuminator for a microscope for illuminating a specimen to create an image of the specimen to be viewed in the microscope, the combination comprising:

a mirror in the shape of a multi-sided pyramid; and at least two light beams illuminating the specimen to create an image of the specimen in the microscope wherein said light beams travel non-coincident paths to different sides of said mirror.

24. The illuminator of claim 23 wherein said mirror and said light beams are disposed for relative movement.

25. The illuminator of claim 24 wherein said mirror has four sides, and the number of light beams is four.

26. The illuminator of claim 24 wherein the microscope is further described as having:

a focusing lens with a rear aperture at a rear aperture plane, and at least one conjugate plane remote from the rear aperture plane, and said mirror is disposed at a conjugate plane of the rear aperture plane of the focusing lens.

27. The illuminator of claim 24 further comprising:

contrasting filters disposed in said light beams before they reach said mirror.

28. The illuminator of claim 27 wherein said filters are chromatic.

29. The illuminator of claim 28 wherein said filters are polarizing.

30. The illuminator of claim 24 further comprising:

a filter carrier disposed in the path of said light beams before said mirror and on which are mounted both contrasting chromatic filters and contrasting polarizing filters.

31. The illuminator of claim 23 wherein said mirror is in the shape of a cone; and said light source is in the shape of a ring disposed surrounding said mirror directing light onto said mirror.

* * * * *